United States Patent [19]
Queinnec

[11] Patent Number: 5,777,600
[45] Date of Patent: Jul. 7, 1998

[54] PROCESS FOR CODING CHARACTER COLORS IN VIDEO SYSTEMS AND DEVICE USING THIS PROCESS

[75] Inventor: Olivier Queinnec, Grenoble, France

[73] Assignee: Thomson Consumer Electronics, Courbevoie, France

[21] Appl. No.: 605,644

[22] Filed: Feb. 22, 1996

Related U.S. Application Data

[63] Continuation of Ser. No. 207,138, Mar. 7, 1994, abandoned.

[30] Foreign Application Priority Data

Mar. 12, 1993 [FR] France .................. 93 02868

[51] Int. Cl.$^6$ .................................................. G09G 5/22
[52] U.S. Cl. .................................... 345/141; 345/150
[58] Field of Search .................................. 345/141, 144, 345/150, 194, 143, 151, 116, 147, 149, 467, 471, 25, 26, 192, 195; 348/589, 600; 395/167, 170

[56] References Cited

U.S. PATENT DOCUMENTS

| | | | |
|---|---|---|---|
| 4,631,585 | 12/1986 | Wine | 348/589 |
| 4,851,825 | 7/1989 | Naiman | 345/143 |
| 4,918,434 | 4/1990 | Veda | 345/150 |
| 5,003,303 | 3/1991 | Kellar et al. | 345/144 |
| 5,153,712 | 10/1992 | Masaike | 348/589 |

FOREIGN PATENT DOCUMENTS 2107954  5/1983  United Kingdom.

*Primary Examiner*—Regina Liang
*Attorney, Agent, or Firm*—Oblon, Spivak, McClelland, Maier & Neustadt, P.C.

[57] ABSTRACT

The invention concerns a process for coding the colors of characters in a video system, which includes a character generator making use of character models comprising at least two zones, and wherein a single color attribute whose level is higher than page level is used to determine the color of all the zones of all the characters corresponding to this level, the luminance values chosen for each of the character zones being such that, for a given character, these zones can be visually distinguished when they are of the same color.

6 Claims, 2 Drawing Sheets

PROCESS FOR CODING CHARACTER COLORS IN VIDEO SYSTEMS AND DEVICE USING THIS PROCESS

This application is a Continuation of application Ser. No. 08/207,138, filed on Mar. 7, 1994, now abandoned.

BACKGROUND OF THE INVENTION

The present invention concerns a process for coding the colors of text characters incrusted in a video image or of text replacing the normal video image. The invention also includes a character-generation device making use of the process.

There exist in the market many character-generating integrated circuits used in video processing devices such as video tape recorders, laser disk readers and decoders for encrypted television. In many cases these circuits generate RGB signals corresponding to the text displayed, which are then incrusted into the RGB signals corresponding to a program. Other devices generate complete video signals which replace the input signal. When the generation circuits are included in the television receiver, the resulting signals are transmitted directly to the circuits controlling the CRT or other display device. When the generation circuits are included in a peripheral device attached to the receiver, the RGB signals corresponding to the text or a complete image are passed to the receiver via a dedicated connector, for example a SCART plug.

Many television receivers, especially outside Europe, are not equipped with a SCART or similar plug. Therefore, to send a signal to the receiver it is necessary to make use of the antenna plug, for example. In this case it is then necessary to code the RGB signal using a particular composite video standard such as PAL, SECAM or NTSC, to name only the main ones.

Unlike most television images, text involves very rapid color transitions. If we consider the width of the minimum image element ("pixel"), the chrominance pass-band is about 4 MHz. Although this value poses no real problem for RGB signals, this is not the case when a particular standard coding is used: for PAL and SECAM the chrominance pass-band is limited to 1 MHz. The same remark applies for coding in the form of Y/C signals.

A display defect appears on the screen due to the rapidity of the color transition itself: since the television processes the chrominance and luminance differently, the delays generated are not identical and a delay line is generally included to compensate the difference. The precision of this delay line is sufficient for a normal image, but not for text: the chrominance and luminance appear out of phase on the screen.

Two other defects, in the form of color smearing and false colors, are due to the limitation of the pass-band of the chrominance during coding of the signal.

A character generation circuit is generally equipped with a ROM-type memory in which models of the available characters are stored. Each character is represented by a matrix of pixels. If it is required to distinguish the character background from the character foreground, a two-dimensional matrix is sufficient. However, it may be required to code in addition some other feature of the character such as a border color. Depending on the number of characteristics to distinguish, the number of bits required to code each pixel increases; the matrix is then three-dimensional.

Two examples of characters are given in FIG. 1. Each one is represented by a matrix of 12 pixels (abscissa X) and 18 lines (ordinate Y). We note the presence of three distinct zones: the background 1, the foreground 2 and the border 3. Therefore 2 bits are required to code each pixel.

In another known embodiment, the border zone is determined by a contour detection circuit using a known type of detection algorithm. The ROM then contains only two-zone models, the third zone being calculated from the others, which economizes ROM storage. Nevertheless, 2 bits per pixel will still be necessary at the output of the contour detection circuit.

The appearance of characters on the screen is determined by parameters generally referred to as attributes. An attribute can, for example, define the color of one of the zones of the character model defined earlier. For the present example we make a distinction between page attributes, row attributes and character attributes. A page attribute is said to be of "low level" since any change of this parameter changes the appearance of all the page (screen) of text. A character attribute, on the other hand, is of "high level" since it is defined independently for each character. It is obvious that storage of high level attributes demands more memory (RAM) than for low level ones.

Generally, for reasons of cost, the character background and border colors are page attributes; the background color of all characters displayed, i.e. the whole page, is then the same, whereas the color of each character may be different.

When a CVBS or Y/C signal must be generated, color transitions are limited in order to limit the appearance of the chrominance defects mentioned earlier.

One solution used consists in giving the same color to all the zones of all characters: the whole text is monochrome. The character zones are then distinguished by their different luminances, the latter being defined independently of the chrominance in the character models. For example, a page of text might have a dark green background, whereas all the character foregrounds and borders are light green.

Another solution is to limit the choice of colors to black and white and levels of gray.

In both cases the potential applications of the circuit are underexploited, especially in comparison with the possibilities of RGB coloring.

SUMMARY OF THE INVENTION

The purpose of the present invention is to improve the possibilities of coloring of characters, for negligible additional cost, while reducing or eliminating the chrominance defects.

The invention concerns a process for coding the colors of characters in a video system, which includes a character generator making use of character models comprising at least two zones, and wherein a single color attribute whose level is higher than page level is used to determine the color of all the zones of all the characters corresponding to this level, the luminance values chosen for each of the character zones being such that, for a given character, these zones can be visually distinguished when they are of the same color.

In a preferred embodiment, the said color attribute is the attribute of highest level. This provides the greatest possible choice of colors for a minimum memory requirement.

In this way we increase artificially the level of attributes of lower level or the same level.

For a given character the colors of the background, border and foreground are identical. On the other hand, if the attribute of the highest level is a character attribute, it will be possible to choose a different color for each character, in which we can obtain a colored mosaic of characters. Visual distinction between the different zones of a given character is assured by assigning at least two different luminance levels to the zones in the character model.

The limitations as regards the choice of colors are then much less restrictive than in solutions used in the prior art. The only constraint—the imposition of a single color for all the zones of a given character—automatically eliminates the chrominance defects within the character. There may remain defects at the boundaries between characters, unless they happen to be of the same color (see reference 4 in FIG. 1). However, these defects are much less serious in that they are perfectly aligned vertically.

In a particular embodiment of the invention, the color attribute whose value is imposed on the others is a row attribute. In this case, the chrominance defects at the boundaries between characters will also disappear, the color being the same for each complete row of characters.

When the color attribute whose value is imposed on the others is a character attribute, it is of course possible to choose the same values for a whole row, in which case (as in the case of the row attribute), the color will be the same for the whole row of characters.

To implement the invention, and improve the choice of colors compared with the prior art, it is therefore sufficient that the character foreground color attribute be either a row attribute or a character attribute. In practice this means that we must reserve in a suitable RAM, for each row of characters or each character, enough memory to store a value for this attribute. Then, to display a character by means of the process according to the invention, the chrominance coding circuits will not take into account this foreground attribute and will give the same value to the other color attributes (background, border or others).

It is particularly advantageous and simple to implement the process according to the invention in a device also generating RGB signals, since if such a device already uses a color attribute for the foreground at character or row level, no extra RAM is necessary.

It is clear that the invention is also applicable in the case where the character model has only a foreground and background but no border zone.

In a particular embodiment, the invention can be used when the video signals must be coded according to a standard whose chrominance pass-band is such that visible chrominance defects arise.

In a particular embodiment, the invention can be used when the video signals must be coded according to the PAL, SECAM, NTSC or SVHS standards.

In a particular embodiment, a device making use of the process according to the invention includes a RAM in which the text to be displayed is stored along with at least the values of the highest-level color attribute, a ROM containing the character models, a color circuit generating, among others, an insertion signal, a generator producing a luminance signal corresponding to the luminance of the text, a coder generating a chrominance signal corresponding to the color of the text, and an insertion circuit inserting the luminance and/or chrominance signals into the input video signal or replacing this signal by the sum of the luminance and chrominance signals, and also includes a multiplex circuit which imposes the value of said color attribute, whose level is higher than page level, in order to color zones not corresponding to this attribute.

BRIEF DESCRIPTION OF THE DRAWINGS

Other characteristics and advantages of the invention will appear in the description that follows, which makes reference to the annexed drawings which represent.

DESCRIPTION OF THE INVENTION

The particular embodiment described below makes reference to a composite video base-band signal (CVBS), but the invention is in no way limited to such signals.

Text generators are devices commonly used in television; the following circuits are examples: Hitachi HD49470, NEC PD6450, Mitsubishi M50557. In the following description only the components peculiar to the invention are described in detail. Circuits such as, for example, the text insertion circuit in itself are of known types.

Figure 1:
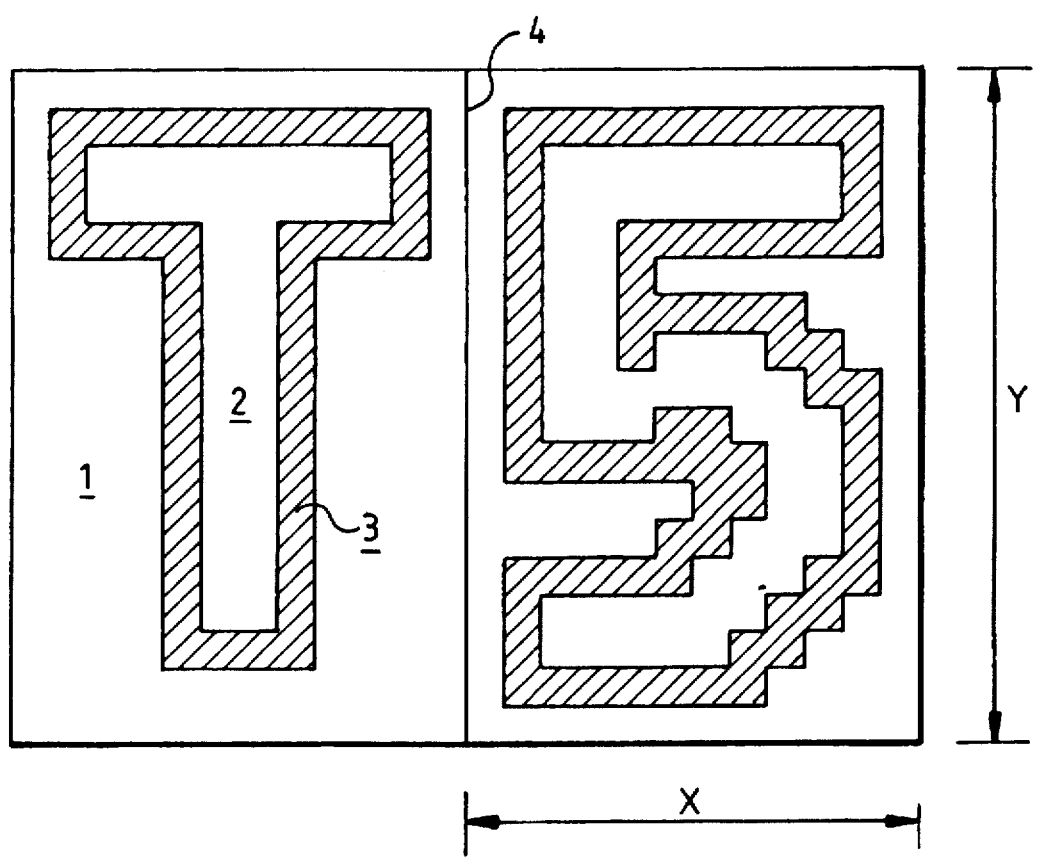
FIG. 1: two examples of character models in the form of matrices of 18 lines of 12 pixels.
Figure 2:
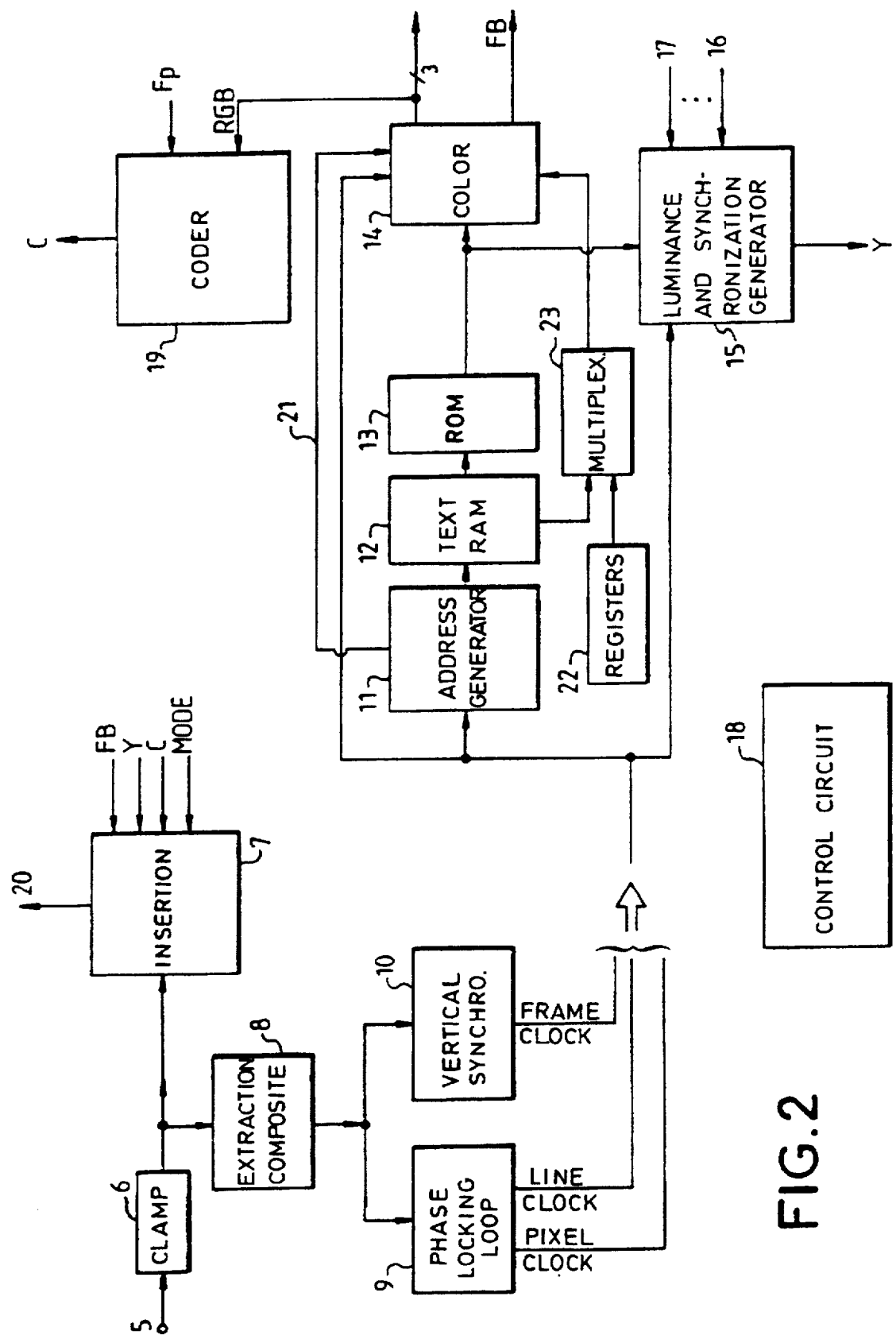
FIG. 2: a functional block diagram of a character-generating device making use of the process according to the invention.

A device making use of the process according to the invention, illustrated in FIG. 2, includes an input contact 5. The CVBS signal is input to the device via this contact. The contact 5 is connected to a clamping circuit 6, whose function is to clamp the CVBS signal at a black reference tension. This clamping circuit includes a clamping capacity (not shown). The clamped signal is applied to an insertion circuit 7 whose role is either to insert a signal corresponding to the text to be displayed in the clamped video signal, or to replace this signal by a signal generated entirely by the text generator. This clamped signal is also applied to a composite synchronization extraction circuit 8, which extracts the line and frame synchronization signals. Using this information a phase locking loop 9 and a vertical synchronization separator 10 construct frame, line and pixel clock pulses; these clock signals are used by the associated parts of the device. In particular they are used by an address generator circuit 11 which divides the image area into rectangles corresponding to the locations of the characters. The address generator 11 includes counters which, using the clock signals, determine the position of the pixel being processed. By accessing a correspondence table which gives the character position as a function of the position of the pixel being processed, the circuit 11 identifies an address in the RAM 12 corresponding to this position. This RAM 12 stores, for example in the form of ASCII codes, the text to be displayed. The addressed storage location in RAM 12 then provides either a character or a code indicating that there is no text at this position.

The RAM 12 also contains the character-level attributes. In the present example, this is the foreground color attribute.

If the available character set contains 128 characters and the maximum size of a complete page of text is 28×11 characters, the size of the RAM 12 must be 28×11=308 7-bit storage locations. The "no text" code is included in this character set. To provide for a choice of 8 alternative colors for each character, 3 extra bits are needed per storage location to store the color attribute code.

The character code contained in the storage location in RAM 12 addressed by the address generator 11 is passed to a ROM 13 and the foreground color attribute code is applied to a color logic circuit 14 (line 21 in FIG. 2). The ROM 13 contains the character models described earlier. If the models are matrices of 18 lines of 12 pixels, with a maximum of three zones (foreground, border and background), this ROM requires 128×18×12 2-bit storage locations.

Using the pixel codes from this ROM 13 corresponding to a character to be displayed, a luminance and synchronization circuit 15 generates a luminance signal Y corresponding to the text to be inserted or displayed. This signal includes line and frame synchronization, based on the clock signals of the device. The lines 16 and 17 apply to the circuit 15 the tensions corresponding to the luminance thresholds of the various zones of the character. In a variant of the embodiment, these tensions are constant and provided by sources within the circuit 15.

The tensions corresponding to the luminance thresholds are chosen such that character displayed in monochrome are easily readable. For a character model with two zones, foreground and background for example, we might choose a background tension corresponding to dark gray and a foreground tension corresponding to white.

The device also includes the color logic circuit 14. This receives information from the ROM 13. A multiplex circuit 23 provides the circuit 14 with either the character attributes from the RAM 12 or the values contained in the registers 22 used to store the page attributes. In the present example, the latter attributes are the border and background colors. In a variant of the embodiment, these two attributes are each coded using 3 bits.

The content of these registers, and the content of the RAM 12 are controlled in a known way by a control circuit 18. In one particular embodiment, this control circuit is a microprocessor.

The color logic circuit 14 generates the complete RGB signals for the text to be displayed and also a "fast blanking" (FB) signal. This generation of the insertion signal could be carried out by another circuit, but for reasons of clarity in the diagram the circuit 14 performs this task. A coder 19 senses the RGB signals and codes the chrominance as per the standard required (for example, amplitude-modulated chrominance for PAL and NTSC, frequency-modulated chrominance for SECAM). This chrominance signal is labelled C in FIG. 2. The circuit 19 includes an input providing the frequency of the color subcarrier $F_p$.

The chrominance signal, luminance signal Y and insertion signal FB are processed by the insertion circuit 7. The insertion of the information representing the text is carried out by a two-way switch of which the common contact is permanently connected to the video output 20 of circuit 7. The switch, controlled by the insertion signal FB, can switch between two other contacts, one of which carries the clamped video signal and the other carries the signal Y or the sum of signal Y and signal C. The insertion circuit 7 has two modes of operation, the first known as "mixed mode" and the second as "full page". Mixed mode consists in multiplexing the input signal with the signal corresponding to the text (luminance and/or chrominance). Full page mode consists in taking into account only the text signal. The insertion signal in this case is always in the active state. The mode is selected via a MODE control line of the control circuit 18.

The device according to the invention has two operating modes. In the first mode, known to professionals of the art, and in the present example, the foreground color attribute (a character-level attribute) enables the color of the foreground of each character to be determined independently, whereas the border and background color attributes (page-level attributes) determine the border and background colors for all the characters on the screen. In this mode, the multiplex 23 passes the values contained in the registers 22 to the color circuit.

In a second operating mode, the character attribute is used to determine both the color of the foreground and the color of the border and background. In this mode, the attributes memorized in the registers 22 are not used. The value of the foreground color attribute, obtained from RAM 12 and passed via the multiplex 23 to the color circuit 14, is processed exactly as if it came from the registers 22.

In a particular embodiment, a bit in a register of the circuit 18 indicates the operating mode required. The value if this bit can be set in several ways. One solution is to leave the choice to the user who then sets the value via a remote control. Another is to set the bit automatically to the value corresponding to the second operating mode when the unit detects, using known means, that the output 20 is used rather than the RGB output.

The first operating mode is conserved in order not to reduce the coloring capacities of the circuit when the output signal is directly a RGB signal and not a signal coded according to a particular standard. It is of course possible to design a specialized circuit used only for the generation of a signal coded to a given standard.

In the example described above the color attribute used to determine the color of all the zones of a given character is a character-level attribute. In a variant of the embodiment, the color attribute is restricted to a row-level attribute. This presents two advantages: the quantity of memory required to store the row attributes is divided by the number of characters per row, and the chrominance defects at the character boundaries are avoided.

What is claimed is:

1. Process for coding the colors of characters in a video system which includes a character generator making use of character models comprising at least two zones, and wherein a single color attribute having an attribute level higher than page level is substituted as a replacement for color attributes of zones of all of the characters corresponding to said attribute level, luminance values chosen for each of the character zones being such that for a given character, said character zones can be visually distinguished when they are of the same color.

2. Process according to claim 1, wherein said color attribute is an attribute of the highest level.

3. Process according to claim 1, wherein said color attribute is an attribute defining the color of the character foreground.

4. Process according to claim 1, wherein said process is applied when video signals must be coded according to a standard whose chrominance pass-band width is such that visible chrominance defects occur.

5. Process according to claim 4, wherein said process is applied when video signals to be input are SVHS video signals or PAL, NTSC or SECAM composite video baseband signals.

6. A character generator device for coding the colors of characters in a video system said character generator device including character models having at least two zones and wherein a single color attribute whose level is higher than page level is used to determine the color of the zones of all the characters corresponding to said level and wherein the luminance values chosen for each of the character zones are such that, for a given character, said zones can be visually distinguished when they are of the same color, said device further comprising:

a RAM for storing text to be displayed with at least values of said single color attribute whose level is higher than page level;

a ROM including said character models wherein said ROM is connected to receive an output of said RAM;

a color circuit means for generating an insertion signal wherein said color circuit means is connected to receive an output from said ROM;

a luminance signal producing generator for producing a luminance signal corresponding to luminance of said text and wherein said luminance generator is connected to receive the output of said ROM;

a coder means for generating a chrominance signal corresponding to a color of said text wherein said coder means is connected to said color circuit generating means;

an insertion circuit receiving said luminance and said chrominance signals and inserting into an input video signal one of said luminance signal, said chrominance signal, and the sum of said luminance signal and chrominance signal; and multiplexing means connected to said RAM for providing said single color attribute whose level is higher than page level in order to color said zones in accordance with said single color attribute instead of other color attributes corresponding to each zone.

* * * * *

UNITED STATES PATENT AND TRADEMARK OFFICE
CERTIFICATE OF CORRECTION

PATENT NO. : 5,777,600

DATED : July 7, 1998

INVENTOR(S) : Olivier QUEINNEC et al.

It is certified that error appears in the above-identified patent and that said Letters Patent is hereby corrected as shown below:

In column 1, line 41, change "1 MHz" to --1.5 MHz--.

In column 3, line 31, change "not take into account" to --take into account only--.

Signed and Sealed this

Eighth Day of December, 1998

Attest:

BRUCE LEHMAN

*Attesting Officer*  *Commissioner of Patents and Trademarks*